US010096149B2

(12) United States Patent
Belogolovy (10) Patent No.: US 10,096,149 B2
(45) Date of Patent: Oct. 9, 2018

(54) DIRECT MOTION SENSOR INPUT TO RENDERING PIPELINE

(71) Applicant: Intel Corporation, Santa Clara, CA (US)

(72) Inventor: Andrey Vladimirovich Belogolovy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 14/976,862

(22) Filed: Dec. 21, 2015

(65) Prior Publication Data
US 2017/0178389 A1 Jun. 22, 2017

(51) Int. Cl.
| G06T 15/20 | (2011.01) |
| G06T 19/00 | (2011.01) |
| G06T 1/20 | (2006.01) |
| G06F 3/16 | (2006.01) |
| G06T 15/00 | (2011.01) |
| G06F 3/01 | (2006.01) |

(52) U.S. Cl.
CPC .............. *G06T 15/20* (2013.01); *G06F 3/012* (2013.01); *G06F 3/16* (2013.01); *G06T 1/20* (2013.01); *G06T 15/005* (2013.01); *G06T 19/006* (2013.01)

(58) Field of Classification Search
CPC ............... G06T 15/20; G06T 15/005; G06T 15/19–15/006; G06T 1/20; G06F 3/15; G06F 3/012
See application file for complete search history.

(56) References Cited

U.S. PATENT DOCUMENTS

| 8,203,558 | B2* | 6/2012 | Abbas ................... G06T 15/005 345/423 |
| 9,544,706 | B1* | 1/2017 | Hirst ....................... H04S 7/302 |
| 2011/0285709 | A1* | 11/2011 | Mejdrich .............. G06T 15/005 345/426 |
| 2012/0114132 | A1* | 5/2012 | Abrahamsson ...... H04R 1/1016 381/74 |
| 2012/0327078 | A1 | 12/2012 | Liao et al. |
| 2014/0092006 | A1 | 4/2014 | Boelter et al. |
| 2015/0077323 | A1 | 3/2015 | Ramaswamy et al. |

(Continued)

FOREIGN PATENT DOCUMENTS

| WO | 2015098211 | 7/2015 |
| WO | 2015123775 | 8/2015 |

OTHER PUBLICATIONS

"International Application Serial No. PCT/US2016/062164, International Search Report dated Jan. 12, 2017", 3 pgs.

(Continued)

*Primary Examiner* — Ariel Balaoing
(74) *Attorney, Agent, or Firm* — Schwegman Lundberg & Woessner, P.A.

(57) ABSTRACT

System and techniques for direct motion sensor input to rendering pipeline are described herein. A view parameter may be received, via an input port to a rendering pipeline, from a sensor. A rendering object may be assigned to a shader in the rendering pipeline. The view parameter may be applied to the shader to re-render the rendering object. The re-rendered rendering object may be output to an output interlink, the output interlink providing instruction to display the re-rendered rendering object.

18 Claims, 4 Drawing Sheets

(56) References Cited

U.S. PATENT DOCUMENTS

2015/0178983 A1* 6/2015 Akenine-Moller ..... G06T 15/80
345/426

OTHER PUBLICATIONS

"International Application Serial No. PCT/US2016/062164, Written Opinion dated Jan. 12, 2017", 5 pgs.
"Smart Glasses Market Report 2015", Augmentedreality,org, http://www.augmentedreality.org/smart-glasses-report, (Accessed on Feb. 1, 2018), 3 pgs.
Zhang, Zhenliang, et al., "3D optical see-through head-mounted display based augmented reality system and its application", International Conference on Optical and Photonic Engineering Proc of SPIE vol. 9524, (2015), 9 pgs.

* cited by examiner

DIRECT MOTION SENSOR INPUT TO RENDERING PIPELINE

TECHNICAL FIELD

Embodiments described herein generally relate to graphical rendering hardware and more specifically to direct motion sensor input to rendering pipeline.

BACKGROUND

Augmented reality (AR) is a term used to define a principle of adding new virtual objects to real scene (e.g., captured by a camera) such that both may be seen on the display. For example, a video feed of a room, including a human, may have a cartoon character rendered in the feed such that it appears that the character is standing next to the human. In an example, the rendering may make it appear, to one viewing the feed, that the human is interacting with the character.

Head worn displays are the devices worn on the head of a user with a display element that the user may see. Head worn displays may look like eye glasses, helmets, etc. Often, the display element is transparent when not in use, such that a user "sees through" the display to the real world but may also observe elements rendered to the display element. Often, head worn displays are combination of sensor set and transparent or non-transparent displays that make possible to "draw" onto the real scene as perceived by the user.

Although AR is not the only application for head worn display, it is an important application for these display. To support this application, some vendors offer System-on-chip (SoC) platforms for AR on head worn displays. Traditionally SoC and hardware manufacturers that develop head worn displays often reuse existing technology components. In the case of video rendering for AR, GPU generally perform video composition immediately (within the pipeline) after rendering. The same is generally true for audio processing.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

AR workloads may be demanding for hardware often intended to be worn and frequently subject to energy limitations (e.g., running on a battery). A hard problem of AR workloads for head worn displays is to constantly maintain correct mapping of rendering (e.g., embedded in the scene) objects to the scene on the display. That is, to make embedded objects transform, shift, and rotate with movements of the user's head to look like they are a part of the scene. See-through displays tend to exacerbate the problem because the scene is not hidden from the user while the display renders the rendering objects. Thus, often when the user moves her head, the rendering object appear out of step with the scene.

To address the issues noted above, a modification to the rendering pipeline may be used. Specifically, the rendering pipeline may be modified to accept motion sensor data directly into the rendering pipeline hardware and use the motion data to directly transform the rendering objects. This may be called single point active alignment method (SPAAM), and may be effective with head worn displays including optical see-through displays. The principle includes calibration for AR based on selection of rendering objects and tracking of points used in a coordinate system for continuing coordinate conversion/transform while the user moves.

Thus, the traditional video or audio rendering pipeline for the display may be altered by adding a block responsible for at least some rendering objects. This block may taking data from the sensors (e.g., sensor hub) and estimate transform parameters for the rendering objects from the sensor data, for example, based on 9-axis head motion trajectory data and the scene geometry. In an example, the block is incorporated into a SoC device or graphical processing unit (GPU) device. In either case, an extra interlink (e.g., bus) may be added from the sensor hub to the block so as to avoid software-based compositing techniques and more quickly re-render the rendering objects. This configuration is contrasted with traditional GPU video/audio pipelines that have no direct connections to the sensors and rendering/blending happen independently from the sensor data.

The unique direct sensor-to-rendering pipeline structures described herein are beneficial over existing techniques by 1) simplifying software operations by offloading AR object transforms to the hardware, often improving overall power consumption; 2) providing a better user experience by reducing reaction latency as the processing will be done on the same hardware; and 3) making application development easier by relieving developers from having to worry about re-rendering AR objects in the event of head motion. It is noted that, while video display is often discussed in the examples below, the same principles apply to audio, as a head orientation with respect to a rendering object position in a scene changes how that audio should be rendered to the user. For example, movement of the head with respect to the rendering object location should change the sound of the rendering object (e.g., making it software because it is farther away, or from another direction than previously rendered to the user).

Figure 1:
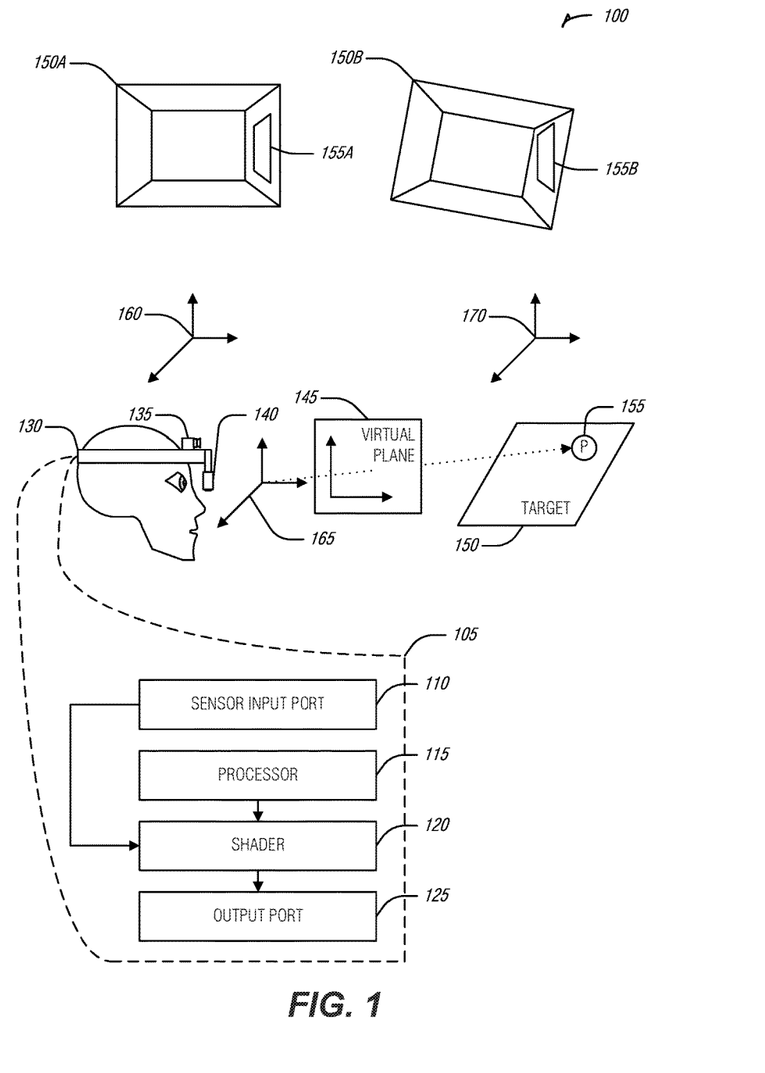
FIG. 1 is a block diagram of an example of an environment including a system for direct motion sensor input to rendering pipeline, according to an embodiment.

FIG. 1 is a block diagram of an example of an environment 100 including a component 105 for direct motion sensor input to rendering pipeline, according to an embodiment. The environment 100 includes a target scene 150 that represents a real-world environment, such as a room, park, etc., which is observable by the user. The user is wearing a head worn device 130. The head worn device 130 includes a camera 135, along with possibly other sensors including motion sensors, and a visual display 140, along with possibly an audio display (e.g., one or more speakers).

To illustrate the issue with present head worn displays, consider the scene 150 as viewed by the user at view 150A with view 155A of the rendering object 155. The user may roll her head to the left. The scene view 150B immediately changes as the user is viewing it with her own eyes. However, the processing delay from the sensors (e.g., the camera 135) to the AR software, to the rendering pipeline causes the rendering object view 155B to be misaligned with respect to the scene view 150B. To elaborate, consider the user's orientation 160, the orientation 140 of the rendering surface (e.g., virtual plane 145) and the scene orientation 170. The user's orientation 160 and the virtual plane orientation 165 are related to each other by the user's movements. As the user's orientation 160 changes, the virtual plane orientation changes in a similar (e.g., identical) manner. However, in order for the AR to work properly, the virtual plane orientation 165 should match the scene orientation 170, which is assumed to move independently of the user's orientation 160, or not move at all. Thus, the challenge is to adjust the virtual plane orientation 165 to match the scene orientation 170 following a change to the user's orientation 160. Thus, as the user views the rendering object 155 via the display 140, the rendering object's orientation is corrected as the user moves her head.

To accomplish the above without the delays associated with current devices, the head worn display 130 includes the component 105 that directly integrates the sensor data into the rendering pipeline. In an example, the component 105 is part of a GPU. In an example, the component 105 is part of an audio pipeline (e.g., audio digital signal processor (DSP)).

The component 105 includes sensor input port 110 arranged to receive a view parameter from a sensor. In an example, the sensor is a motion sensor providing at least one of pitch, yaw, roll, or a translation of up, down, left, or right. In an example, the sensor is the camera 135. In this example, the camera 135 may intrinsically, or via a device-driver chain, provide the view parameter. For example, the camera 135 may capture two images in sequence and register the images to each other. If there is any motion between the two images, the registration will reveal a transformation indicating the motion because the images will not line up exactly. In an example, the sensor input port 110 has a bandwidth of at least 384 kilobits a second. In an example, the sensor input port 110 is on a bus connected to the sensor. Thus, this connection is direct in that it does not pass to the application software that ultimately produces the rendering objects. However, it is understood that they may be separated by a virtual device hardware or software, such as that used in virtual machines, a device driver for the sensors, or the like.

In an example, the view parameter is at least one of a viewing point coordinate or a view angle. In this example, the sensor output is converted into at least one of the viewing point coordinate or the viewing angle by the sensor itself, a driver or similar software interfacing the sensor to the head worn display 130, or the like. In an example, the view parameter is raw data from the motion sensor. In this example, the shader 120 is arranged to handle the direct sensor data to perform the rendering object 155 transforms. In an example, the rendering object is a visual object. Such an object may include such things as an avatar or other character, a virtual game board, virtual television screen, virtual ball, or the like. In an example, the rendering object is an audible object. Example audio objects may include a voice, music, slamming door or other sound effect, or the like. The audio rendering object, like the visual rendering object, inhabits a place in a coordinate system often defined by the target scene 150. Thus, in the case of audio, if the user turns her head to the right when the rendering object 155 is in front of her, the head worn display's speakers should take the original balanced sound and bias it towards the left speaker.

The component 105 includes a processor 115 to assign the rendering object 155 to a shader 120 in the rendering pipeline. In an example, the assignment is directed by the AR application producing the rendering object 155. That is, assigning the rendering object to the shader 120 includes receiving an instruction from an AR program that provided a definition for the rendering object. In this example, the instruction specifies that the rendering object should be tied to sensor input for rendering. Thus, the developer may be in control of which rendering objects will receive the benefit of possibly limited hardware. In an example, the instruction may specify a priority value to the rendering object. Thus, the developer may designate more rendering objects to be tied to the sensors than there are available shaders and the assignment may proceed by order the rendering objects based on the designated priority value. In an example, the priority value may correlate with a designated priority group encompassing a plurality of rendering objects.

In an example, the assignment is based on observable metrics, such as a rendering object most interacted with by the user, a rendering object that is used most frequently, etc. In this example, the developer may be relieved from the responsibility of selecting particular rendering objects and let the processor 115 make the decision. This decision may be based on statistical techniques, operations research techniques, or trained artificial intelligence techniques to, for example, optimize use of the shaders, enhance user experience (e.g., via feedback from the user), reduce power consumption, or any combination of these. Although not the same, this example operates in a fashion analogous to caching for data retrieval.

The rendering object 155 is defined in terms of the view parameter. That is, the shader 120 is receiving motion data in the form of the view parameter and the object definition should conform to a transform informed by the view parameter. An example may include object geometry with respect to a viewing point and a viewing angle. As these view parameters are received from the motion sensors, the shader 120 may apply them to the rendering object's definition and produce the re-rendered rendering object.

The shader 120 is arranged to apply the view parameter re-render the rendering object 155. In an example, the shader 120 is dedicated to a single rendering object at a time. In an example, the shader 120 is one of a set of shaders, the rendering object 155 is one of a set of rendering objects, and there are more rendering objects than dedicated shaders. For example, there may only be five to ten dedicated shaders and fifty rendering objects. In this example, the rendering object assignment to the shader 120 may be an issue when the shader may only render one render object at a time. However, in an example, the processor 115 may be arranged to assign a second rendering object to the shader at a different time than the rendering object 155 while program that created the rendering objects is running. Thus, the processor 115 may employ a time-division duplex mechanism to address more rendering objects at the cost of some responsiveness for each individual rendering object. This technique, however, may be applied to different classes of rendering objects selectively. For example, if a virtual television screen is projected on a wall, it may be assumed to be a center of the user's attention. Thus, misalignment between the scene orientation 170 and the virtual plane orientation 165 may be a distraction to the user. Thus, dedicating the shader 120 to this one rendering object 155 is probably effective. In contrast, a number of virtual pictures placed on the walls may serve as an aesthetic background that does not demand the user's attention. Such rendering objects may share a different shader in a time-division manner to maximize the limited hardware resources. Thus, the processor 115 may alternately assign the rendering object 155 and a second to the shader for set periods. (e.g., respective a time slices).

The component 105 includes an output port 125 to output the re-rendered rendering object to an output interlink. Examples may include a bus interface for the display 140, a driver line for speakers, etc. In an example, the output port 125 is a memory, such as may be used for direct memory access (DMA) transfers to a driver or other object receiving data to output on the display 140. Thus, the output interlink provides instruction to display the re-rendered rendering object 155.

Figure 2:
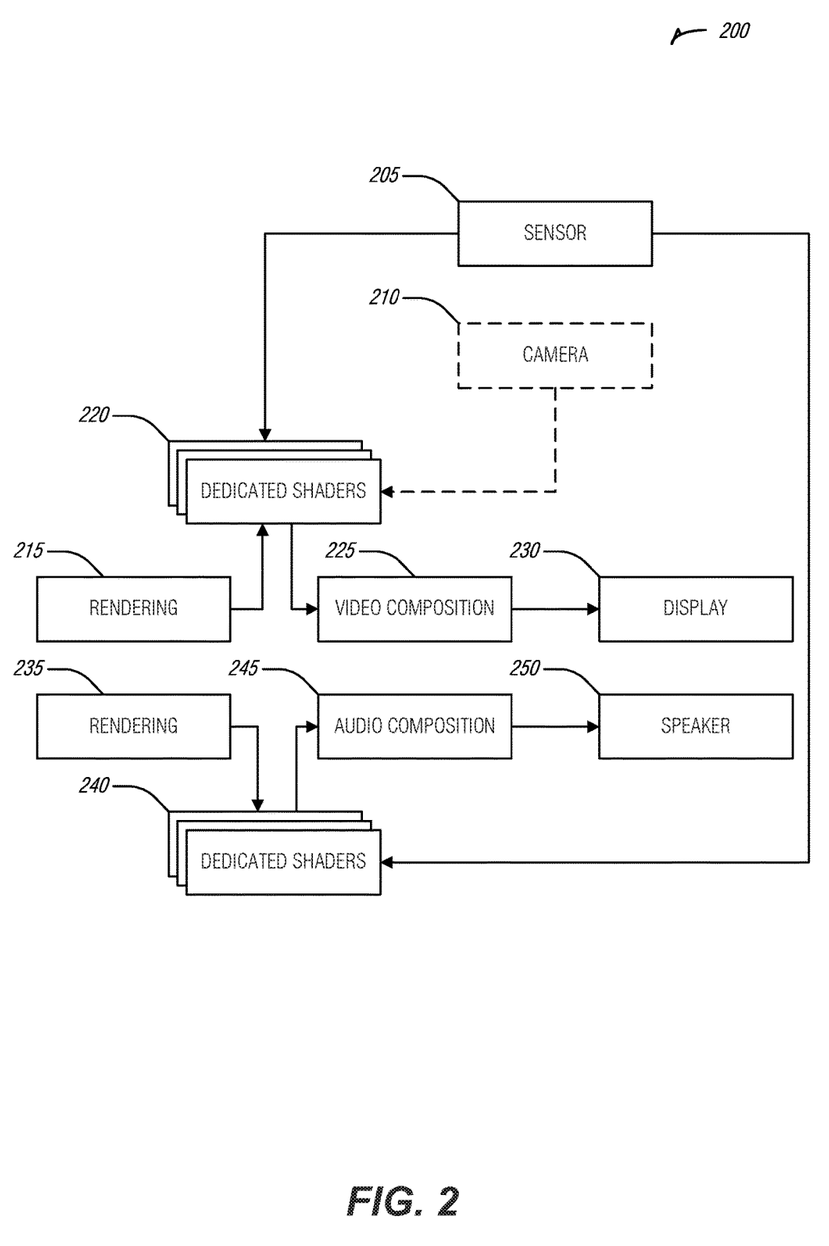
FIG. 2 illustrates a block diagram of an example of a system for direct motion sensor input to rendering pipeline, according to an embodiment.

FIG. 2 illustrates a block diagram of an example of a system 200 for direct motion sensor input to rendering pipeline, according to an embodiment. As illustrated, the system 200 includes a visual pipeline (e.g., rendering block 215, shaders 220, video composition block 225, and display 230) and an audio pipeline (e.g., rendering block 235, shaders 240, audio composition block 245, and a speaker 250). In an example, only the visual pipeline is present. In an example, only the audio pipeline is present.

As noted above, traditionally hardware manufacturers that develop head worn displays reuse existing technology components. Thus, in the case of AR rendering hardware, GPUs and audio processors connect the rendering blocks 215 and 235 directly to the composition blocks 225 and 245. The disadvantage of this approach is evident in the case of head motion. When the head moves, the sensor data is delivered to the program, which then adjusts the rendering parameters of rendering objects. These adjusted parameters are then processed the very beginning of the GPU or audio pipeline. This is not only time consuming, possibly leading to desynchronization of the rendering object and the scene, but power consuming as well.

To address these issues, the system 200 adds a direct connection from the sensor 205 to the rendering pipeline, here to the dedicated shaders 220 and 240. This direct connection may be a bus, or may simply be enabled by adding a control line, port, etc., to a GPU or audio DSP to directly accept the sensor data. Further, by using the dedicated shaders 220 and 240 that are configured to translate the rendering object directly based on the sensor data, the GPU or audio block may reuse hardware and software techniques to reduce complexity while still being performant.

As illustrated, the sensor 205, is separate from the camera 210, which may also be used for motion data. However, both may be incorporated into a sensor array or the like of a head mounted device, and in an example, the camera 210 may simply be another type of the sensor 205, along with an accelerometer, landmark detector, gyroscope, etc. Further, in an example, the camera 210 may provide motion data to the dedicated shaders 240 of the audio pipeline.

System 200 outperforms current devices because, instead of re-rendering of the whole environment (e.g., picture in the case of video), individual rendering objects are re-rendered by the dedicated shaders 220 and 240 as the head moves. To facilitate this, rendering objects are separated from each other and defined (e.g., described) them in a form that depends on viewing parameters (e.g., the viewing point coordinates and view angle). These separated rendering objects are each assigned to a dedicated shader. The remaining rendering objects from the application are rendered as they previously would have been (e.g., without the benefit of the direct motion data).

As the user moves her head, the sensor 205 will register these movements. The sensor data may be processed by the sensor 205 to create the view parameters, or the raw output may correspond to the view parameters. These view parameters are then fed directly into the dedicated shaders 220 and 240. These dedicated shaders 220 and 240 accept the view parameters and already have the definitions of rendering objects assigned to them. The dedicated shaders 220 and 240 transform each's respectively assigned rendering object using the view parameters. These re-rendered rendering objects may then be directly composited by the composition blocks 225 and 245.

The number of dedicated shaders 220 and 240 is a parameter to the respective rendering pipelines. In an example, it is possible to reuse the same shader for multiple rendering objects, but it is an implementation trade-off between hardware area and operational speed giving a certain number of rendering objects. In an example, a useful balance between hardware area and performance may be found between five and ten dedicated shaders.

The bus between the sensors and the GPU/audio DSP should be enough to transfer 10-dimensional 16-bit data at the sampling rate of order of 2.4 KHz, which is a typical output the sensor 205. In this example, the bandwidth of such a bus is about 384 kilobits a second.

In the case where the number of rendering objects is greater than the number of dedicated shaders 220 or 240, the developer specifies which rendering objects will benefit from the dedicated shaders 220 and 245. For example, in the case of a high number of rendering objects, it is up to a developer to decide which of them will be re-rendered by the dedicated shaders 220 or 240 based on the importance of the rendering objects to the user experience. Further, it may be incumbent on the developer to define the rendering objects in such a way that the dedicated shaders 220 and 245 may directly use the sensor data from the sensor 205. However, some helper facility may be used to facilitate these operations, such as a monitor to determine which rendering objects are most interacted with by the user, or a transpiler to conform a standard object definition into one suitable for the dedicated shader given a particular type of sensor 205.

Figure 3:
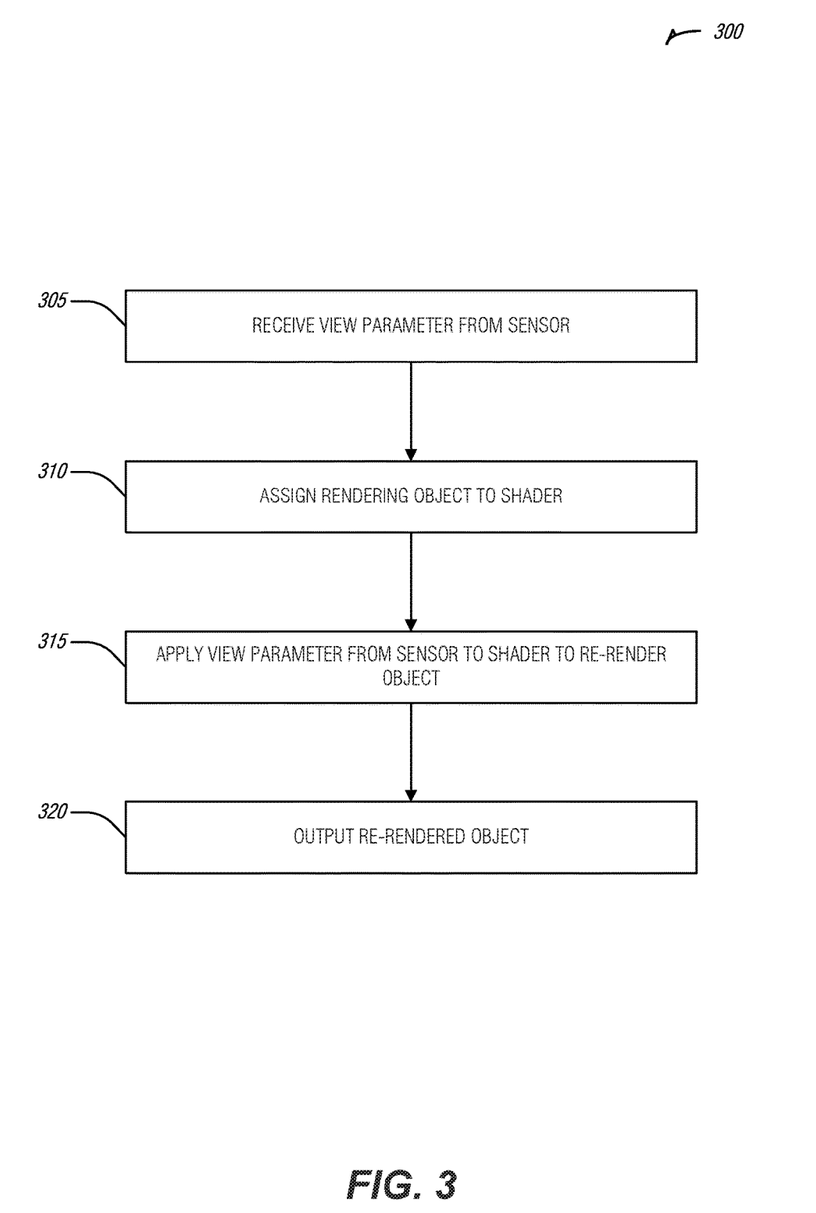
FIG. 3 illustrates an example of a method for direct motion sensor input to rendering pipeline, according to an embodiment.

FIG. 3 illustrates an example of a method 300 for direct motion sensor input to rendering pipeline, according to an embodiment. The operations of the method 300 are performed on computer hardware, such as that described above with respect to FIGS. 1 and 2, or below with respect to FIG. 4 (e.g., circuit sets).

At operation 305, a view parameter may be received from a sensor via an input port to a rendering pipeline. In an example, the sensor is a motion sensor providing at least one of pitch, yaw, roll, or a translation of up, down, left, or right. In an example, the sensor is a camera. In an example, the input port has a bandwidth of at least 384 kilobits a second. In an example, the input port is on a bus connected to the sensor. In an example, the view parameter is at least one of a viewing point coordinate or a view angle. In an example, the rendering object is a visual object. In an example, the rendering object is an audible object.

At operation 310, a rendering object may be assigned to a shader in the rendering pipeline. The rendering object, in this case, is one that is defined in terms of the view parameter. In an example, the shader may be dedicated to a single rendering object at a time (e.g., it cannot operate on two rendering objects within a frame). In an example, assigning the rendering object to the shader includes receiving an instruction from an augmented reality program that provided a definition for the rendering object. The instruction also specifies that the rendering object should be tied to sensor input for rendering.

At operation 315, the view parameter may be applied to the shader to re-render the rendering object. In an example, the shader is one of a set of shaders, the rendering object is one of a set of rendering objects, and the cardinality of the set of rendering objects is greater than the cardinality of the set of shaders. That is, there are fewer shaders than rendering objects. In an example, the cardinality of the set of shaders is in the range of five to ten.

In an example, the method 300 may be expanded to include assigning a second rendering object to the shader at a different time than the rendering object while a program is running that includes both the rendering object and the second rendering object. Thus, the developer may re-task the shader to different rendering objects at different times during the program's run. In an example, the rendering object and the second rendering object are alternately assigned to the shader for set periods. Such an alternating arrangement operates as a time-sharing of the dedicated shader for the rendering objects. Although the user may observe additional jitter in the finally rendered product, this arrangement maintains the benefits of convenience to the developer and offloading software processing to composite the rendering objects in the scene.

At operation 320, outputting the re-rendered rendering object to an output interlink, the output interlink providing instruction to display the re-rendered rendering object. In an example, the display is a visual display. In an example, the display is an audio display. In an example, the interlink is directly connected to the display.

Figure 4:
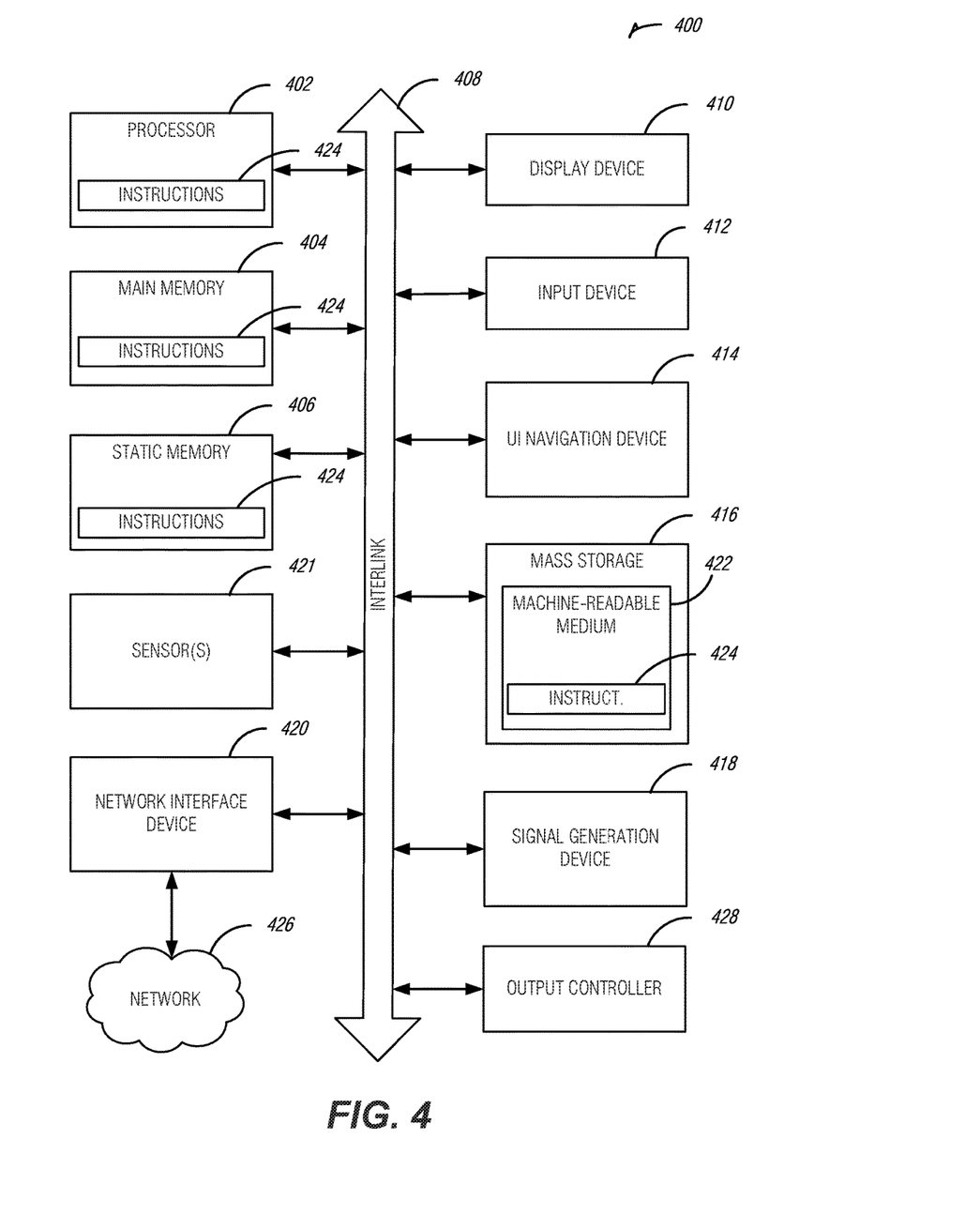
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES & EXAMPLES

Example 1 is a component for direct motion sensor input to rendering pipeline, the component comprising: an input port to receive a view parameter from a sensor; a processor to assign a rendering object to a shader in the rendering pipeline, the rendering object defined in terms of the view parameter, the shader being dedicated to a single rendering object at a time; the shader to apply the view parameter re-render the rendering object; and an output port to output the re-rendered rendering object to an output interlink, the output interlink providing instruction to display the re-rendered rendering object.

In Example 2, the subject matter of Example 1 optionally includes wherein the sensor is a motion sensor to provide at least one of pitch, yaw, roll, or a translation of up, down, left, or right.

In Example 3, the subject matter of any one or more of Examples 1-2 optionally include wherein the sensor is a camera.

In Example 4, the subject matter of any one or more of Examples 1-3 optionally include wherein the view parameter is at least one of a viewing point coordinate or a view angle.

In Example 5, the subject matter of any one or more of Examples 1-4 optionally include wherein the rendering object is a visual object.

In Example 6, the subject matter of any one or more of Examples 1-5 optionally include wherein the rendering object is an audible object.

In Example 7, the subject matter of any one or more of Examples 1-6 optionally include wherein the shader is one of a set of shaders, wherein the rendering object is one of a set of rendering objects, and wherein a cardinality of the set of rendering objects is greater than the cardinality of the set of shaders.

In Example 8, the subject matter of Example 7 optionally includes wherein the cardinality of the set of shaders is in the range of five to ten.

In Example 9, the subject matter of any one or more of Examples 7-8 optionally include wherein the processor is to assign a second rendering object to the shader at a different time than the rendering object while a program is running that includes both the rendering object and the second rendering object.

In Example 10, the subject matter of Example 9 optionally includes wherein the rendering object and the second rendering object are alternately assigned to the shader for set periods.

In Example 11, the subject matter of any one or more of Examples 1-10 optionally include wherein the input port has a bandwidth of at least 384 kilobits a second.

In Example 12, the subject matter of any one or more of Examples 1-11 optionally include wherein the input port is on a bus connected to the sensor.

In Example 13, the subject matter of any one or more of Examples 1-12 optionally include wherein to assign the rendering object to the shader includes the processor to receive an instruction from an augmented reality program that provided a definition for the rendering object, the instruction specifying that the rendering object should be tied to sensor input for rendering.

Example 14 is a method for direct motion sensor input to rendering pipeline, the method comprising: receiving, via an input port to a rendering pipeline, a view parameter from a sensor; assigning a rendering object to a shader in the rendering pipeline, the rendering object defined in terms of the view parameter, the shader being dedicated to a single rendering object at a time; applying the view parameter to the shader to re-render the rendering object; and outputting the re-rendered rendering object to an output interlink, the output interlink providing instruction to display the re-rendered rendering object.

In Example 15, the subject matter of Example 14 optionally includes wherein the sensor is a motion sensor providing at least one of pitch, yaw, roll, or a translation of up, down, left, or right.

In Example 16, the subject matter of any one or more of Examples 14-15 optionally include wherein the sensor is a camera.

In Example 17, the subject matter of any one or more of Examples 14-16 optionally include wherein the view parameter is at least one of a viewing point coordinate or a view angle.

In Example 18, the subject matter of any one or more of Examples 14-17 optionally include wherein the rendering object is a visual object.

In Example 19, the subject matter of any one or more of Examples 14-18 optionally include wherein the rendering object is an audible object.

In Example 20, the subject matter of any one or more of Examples 14-19 optionally include wherein the shader is one of a set of shaders, wherein the rendering object is one of a set of rendering objects, and wherein a cardinality of the set of rendering objects is greater than the cardinality of the set of shaders.

In Example 21, the subject matter of Example 20 optionally includes wherein the cardinality of the set of shaders is in the range of five to ten.

In Example 22, the subject matter of any one or more of Examples 20-21 optionally include assigning a second rendering object to the shader at a different time than the rendering object while a program is running that includes both the rendering object and the second rendering object.

In Example 23, the subject matter of Example 22 optionally includes wherein the rendering object and the second rendering object are alternately assigned to the shader for set periods.

In Example 24, the subject matter of any one or more of Examples 14-23 optionally include wherein the input port has a bandwidth of at least 384 kilobits a second.

In Example 25, the subject matter of any one or more of Examples 14-24 optionally include wherein the input port is on a bus connected to the sensor.

In Example 26, the subject matter of any one or more of Examples 14-25 optionally include wherein assigning the rendering object to the shader includes receiving an instruction from an augmented reality program that provided a definition for the rendering object, the instruction specifying that the rendering object should be tied to sensor input for rendering.

Example 27 is at least one machine readable medium including instructions that, when executed by the machine, cause the machine to perform any of methods 14-26.

Example 28 is a system including means to perform any of methods 14-26.

Example 29 is a system for direct motion sensor input to rendering pipeline, the system comprising: means for receiving, via an input port to a rendering pipeline, a view parameter from a sensor; means for assigning a rendering object to a shader in the rendering pipeline, the rendering object defined in terms of the view parameter, the shader being dedicated to a single rendering object at a time; means for applying the view parameter to the shader to re-render the rendering object; and means for outputting the re-rendered rendering object to an output interlink, the output interlink providing instruction to display the re-rendered rendering object.

In Example 30, the subject matter of Example 29 optionally includes wherein the sensor is a motion sensor providing at least one of pitch, yaw, roll, or a translation of up, down, left, or right.

In Example 31, the subject matter of any one or more of Examples 29-30 optionally include wherein the sensor is a camera.

In Example 32, the subject matter of any one or more of Examples 29-31 optionally include wherein the view parameter is at least one of a viewing point coordinate or a view angle.

In Example 33, the subject matter of any one or more of Examples 29-32 optionally include wherein the rendering object is a visual object.

In Example 34, the subject matter of any one or more of Examples 29-33 optionally include wherein the rendering object is an audible object.

In Example 35, the subject matter of any one or more of Examples 29-34 optionally include wherein the shader is one of a set of shaders, wherein the rendering object is one of a set of rendering objects, and wherein a cardinality of the set of rendering objects is greater than the cardinality of the set of shaders.

In Example 36, the subject matter of Example 35 optionally includes wherein the cardinality of the set of shaders is in the range of five to ten.

In Example 37, the subject matter of any one or more of Examples 35-36 optionally include means for assigning a second rendering object to the shader at a different time than the rendering object while a program is running that includes both the rendering object and the second rendering object.

In Example 38, the subject matter of Example 37 optionally includes wherein the rendering object and the second rendering object are alternately assigned to the shader for set periods.

In Example 39, the subject matter of any one or more of Examples 29-38 optionally include wherein the input port has a bandwidth of at least 384 kilobits a second.

In Example 40, the subject matter of any one or more of Examples 29-39 optionally include wherein the input port is on a bus connected to the sensor.

In Example 41, the subject matter of any one or more of Examples 29-40 optionally include wherein assigning the rendering object to the shader includes means for receiving an instruction from an augmented reality program that provided a definition for the rendering object, the instruction specifying that the rendering object should be tied to sensor input for rendering.

Example 42 is at least one machine readable medium including instructions for direct motion sensor input to rendering pipeline, the instructions, when executed by a machine, cause the machine to perform operations comprising: receiving, via an input port to a rendering pipeline, a view parameter from a sensor; assigning a rendering object to a shader in the rendering pipeline, the rendering object defined in terms of the view parameter, the shader being dedicated to a single rendering object at a time; applying the view parameter to the shader to re-render the rendering object; and outputting the re-rendered rendering object to an output interlink, the output interlink providing instruction to display the re-rendered rendering object.

In Example 43, the subject matter of Example 42 optionally includes wherein the sensor is a motion sensor providing at least one of pitch, yaw, roll, or a translation of up, down, left, or right.

In Example 44, the subject matter of any one or more of Examples 42-43 optionally include wherein the sensor is a camera.

In Example 45, the subject matter of any one or more of Examples 42-44 optionally include wherein the view parameter is at least one of a viewing point coordinate or a view angle.

In Example 46, the subject matter of any one or more of Examples 42-45 optionally include wherein the rendering object is a visual object.

In Example 47, the subject matter of any one or more of Examples 42-46 optionally include wherein the rendering object is an audible object.

In Example 48, the subject matter of any one or more of Examples 42-47 optionally include wherein the shader is one of a set of shaders, wherein the rendering object is one of a set of rendering objects, and wherein a cardinality of the set of rendering objects is greater than the cardinality of the set of shaders.

In Example 49, the subject matter of Example 48 optionally includes wherein the cardinality of the set of shaders is in the range of five to ten.

In Example 50, the subject matter of any one or more of Examples 48-49 optionally include wherein the operations include assigning a second rendering object to the shader at a different time than the rendering object while a program is running that includes both the rendering object and the second rendering object.

In Example 51, the subject matter of Example 50 optionally includes wherein the rendering object and the second rendering object are alternately assigned to the shader for set periods.

In Example 52, the subject matter of any one or more of Examples 42-51 optionally include wherein the input port has a bandwidth of at least 384 kilobits a second.

In Example 53, the subject matter of any one or more of Examples 42-52 optionally include wherein the input port is on a bus connected to the sensor.

In Example 54, the subject matter of any one or more of Examples 42-53 optionally include wherein assigning the rendering object to the shader includes receiving an instruction from an augmented reality program that provided a definition for the rendering object, the instruction specifying that the rendering object should be tied to sensor input for rendering.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. At least one non-transitory-machine readable medium including instructions for direct motion sensor input to rendering pipeline, the instructions, when executed by a machine, cause the machine to perform operations comprising:

receiving, via an input port to a rendering pipeline, a view parameter from a sensor, wherein the input port is a bus directly connecting the sensor to the rendering pipeline, the rendering pipeline being one of a graphics processing unit (GPU) or audio digital signal processor;

assigning a rendering object to a shader in the rendering pipeline, the rendering object defined in terms of the view parameter, the shader being dedicated to a single rendering object at a time, wherein a processor of the rendering pipeline assigned the rendering object to the shader in response to an instruction from an augmented reality program that defined the rendering object, the instruction specifying that the rendering object should be tied to the sensor;

applying the view parameter to the shatter to re-render the rendering object; and outputting the re-rendered rendering object to an output interlink, the output interlink providing instruction to display the re-rendered rendering object.

2. The machine readable medium of claim 1, wherein the sensor is a motion sensor providing at least one of pitch, yaw, roll, or a translation of up, down, left, or right.

3. The machine readable medium of claim 1, wherein the rendering object is a visual object.

4. The machine readable medium of claim 1, wherein the rendering object is an audible object.

5. The machine readable medium of claim 1, wherein the shader is one of a set of shaders, wherein the rendering object is one of a set of rendering objects, and wherein a cardinality of the set of rendering objects is greater than the cardinality of the set of shaders.

6. The machine readable medium of claim 5, wherein the operations include assigning a second rendering object to die shader at a different time than the rendering object while a program is running that includes both the rendering object and the second rendering object.

7. A method for direct motion sensor input to rendering pipeline, method comprising:

receiving, via an input port to a rendering pipeline, a view parameter from a sensor, wherein the input port is a bus directly connecting the sensor to the rendering pipeline, the rendering pipeline being one of a graphics processing unit (GPU) or audio digital signal processor;

assigning a rendering object to a shader in the rendering pipeline, the rendering object defined in terms of the view parameter, the shader being dedicated to a single rendering object at a time, wherein a processor of the rendering pipeline assigned the rendering object to the shader in response to an instruction from an augmented reality program that defined the rendering object, the instruction specifying that the rendering object should be tied to the sensor;

applying the view parameter to the shader to re-render the rendering object; and outputting the re-rendered rendering object to an output interlink, the output interlink providing instruction to display the re-rendered rendering object.

8. The method of claim 7, wherein the sensor is a motion sensor providing at least one of pitch, yaw, roll, or a translation of up, down, left, or right.

9. The method of claim 7, wherein the rendering object is a visual object.

10. The method of claim 7, wherein the rendering object is an audible object.

11. The method of claim 7, wherein the shader is one of a set of shaders, wherein the rendering object is one of a set of rendering objects, and wherein a cardinality of the set of rendering objects is greater than the cardinality of the set of shaders.

12. The method of claim 11, comprising assigning a second rendering object to the shader at a different time than the rendering object while a program is running that includes both the rendering object and the second rendering object.

13. A component for direct motion sensor input to rendering pipeline, the component comprising:

an input port to receive a view parameter from a sensor, wherein the input port is a bus directly connecting the sensor to the component, and wherein the component is included in at least one of a graphics processing unit (GPU) or audio digital signal processor;

a processor to assign a rendering object to a shader in the rendering pipeline, the rendering object defined in terms of the view parameter, the shader being dedicated to a single rendering object at a time, the assignment to the shader of the rendering object is in response to an instruction from an augmented reality program that defined the rendering object, the instruction specifying that the rendering object should be tied to the sensor;

the shader to apply the view parameter to re-render the rendering object; and an output port to output the re-rendered rendering object to an output interlink, the output interlink providing instruction to display the re-rendered rendering object.

14. The component of claim 13, wherein the sensor is a motion sensor to provide at least one of pitch, yaw, roll, or a translation of up, down, left, or right.

15. The component of claim 13, wherein the rendering object is a visual object.

16. The component of claim 13, wherein the rendering object is an audible object.

17. The component of claim 13, wherein the shader is one of a set of shaders, wherein the rendering object is one of a set of rendering objects, and wherein a cardinality of the set of rendering objects is greater than the cardinality of the set of shaders.

18. The component of claim 17, wherein the processor is to assign a second rendering object to the shader at a different time than the rendering object while a program is running that includes both the rendering object and the second rendering object.

\* \* \* \* \*

UNITED STATES PATENT AND TRADEMARK OFFICE
CERTIFICATE OF CORRECTION

PATENT NO.        : 10,096,149 B2
APPLICATION NO.   : 14/976862
DATED             : October 9, 2018
INVENTOR(S)       : Andrey Vladimirovich Belogolovy It is certified that error appears in the above-identified patent and that said Letters Patent is hereby corrected as shown below:

In the Claims

In Column 14, Line 22, in Claim 1, delete "non-transitory-machine" and insert --non-transitory machine-- therefor In Column 14, Line 41, in Claim 1, delete "shatter" and insert --shader-- therefor In Column 14, Line 59, in Claim 6, delete "die" and insert --the-- therefor In Column 14, Line 64, in Claim 7, before "method", insert --the--

Signed and Sealed this
Eighteenth Day of June, 2019

Andrei Iancu
*Director of the United States Patent and Trademark Office*